United States Patent [19]

Meinel

[11] Patent Number: 5,769,369
[45] Date of Patent: Jun. 23, 1998

[54] MOBILE OFFICE STAND FOR SUPPORTING A PORTABLE COMPUTER OR ELECTRONIC ORGANIZER IN VEHICLES

[76] Inventor: James Meinel, 707 E. 62nd St., Los Angeles, Calif. 90001

[21] Appl. No.: 431,113

[22] Filed: Apr. 28, 1995

[51] Int. Cl.[6] .............................. A47B 19/00; A47B 23/00
[52] U.S. Cl. ..................... 248/176.1; 108/45; 248/176.1; 248/178.1; 248/181.1; 248/451; 248/453; 248/917
[58] Field of Search ............................. 248/178.1, 181.1, 248/181.2, 451, 452, 453, 917, 176.1; 108/44, 45

[56] References Cited

U.S. PATENT DOCUMENTS

| | | | |
|---|---|---|---|
| 1,627,350 | 5/1927 | Steinman | 248/451 |
| 2,950,836 | 8/1960 | Murdock | 248/181.1 X |
| 4,285,532 | 8/1981 | Davis | 248/451 X |
| 4,672,898 | 6/1987 | Davidson | 108/44 X |
| 4,842,174 | 6/1989 | Sheppard et al. | 108/45 X |
| 5,025,353 | 6/1991 | Menaged | 248/453 X |
| 5,177,665 | 1/1993 | Frank et al. | 108/44 X |
| 5,279,488 | 1/1994 | Fleming | 248/181.1 X |
| 5,341,929 | 8/1994 | Stefancin, Jr. | 248/917 X |
| 5,485,793 | 1/1996 | Crowell | 108/44 |
| 5,487,521 | 1/1996 | Callahan | 248/917 X |

*Primary Examiner*—Wynn E. Wood
*Attorney, Agent, or Firm*—Matthew F. Jodziewicz

[57] ABSTRACT

An apparatus for supporting and holding an electronic organizer device for use in a vehicle, includes a generally rectangularly shaped cradle member for retaining the device. At least one pair of opposing jaw members are mounted on opposed peripheral edges of the cradle member for releasably holding the device in the cradle. The jaw members are biased toward one another by attached tensioned springs. An elongated stand member has on a first end a universal ball and socket joint assembly for attachment to the cradle, and can be releasably locked for holding the cradle in a spatial orientation selected by a user. The opposite second end of the stand member is adapted to releasably mate with a stand member for engagement with a surface for supporting the cradle member.

35 Claims, 6 Drawing Sheets

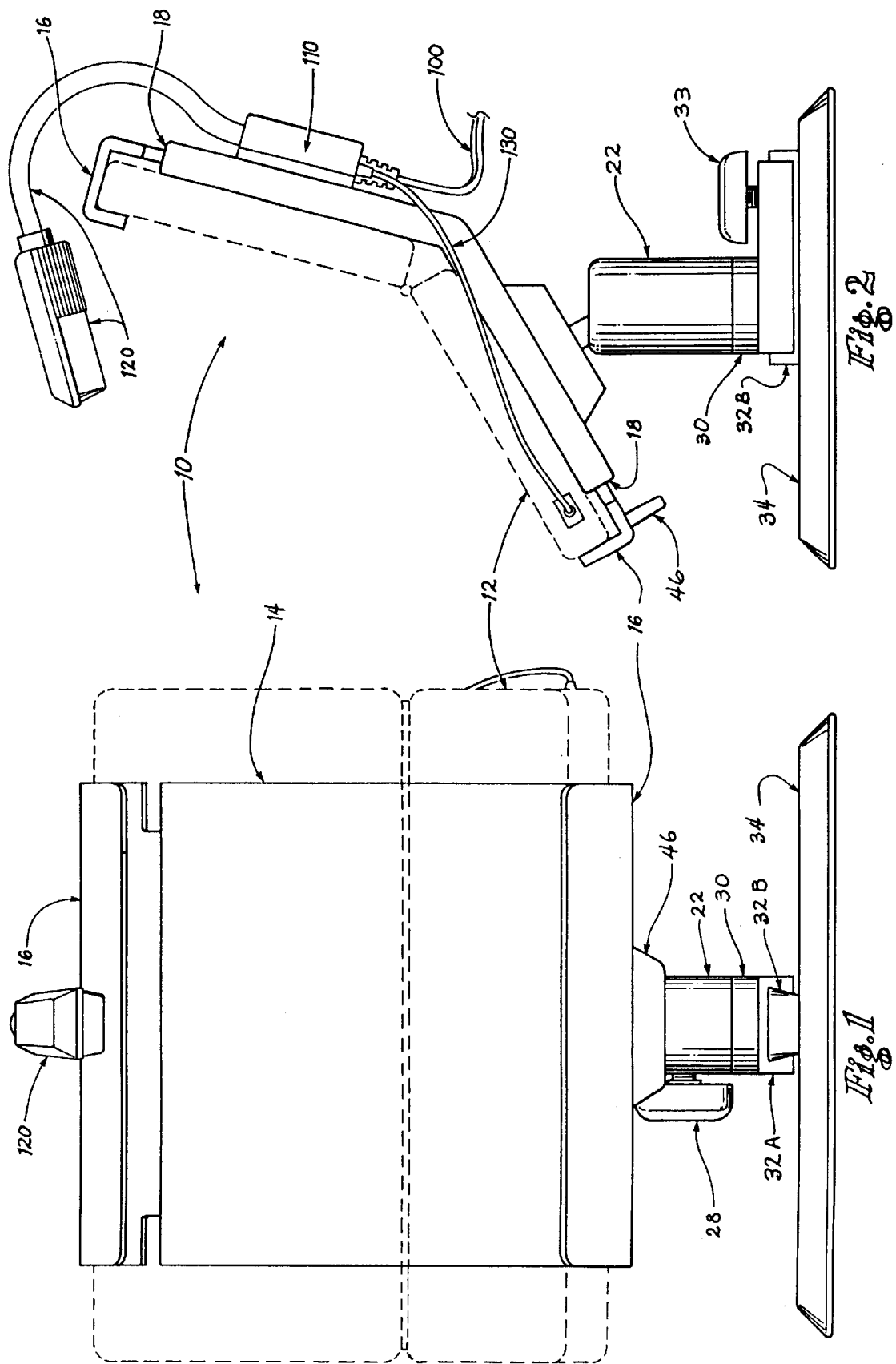

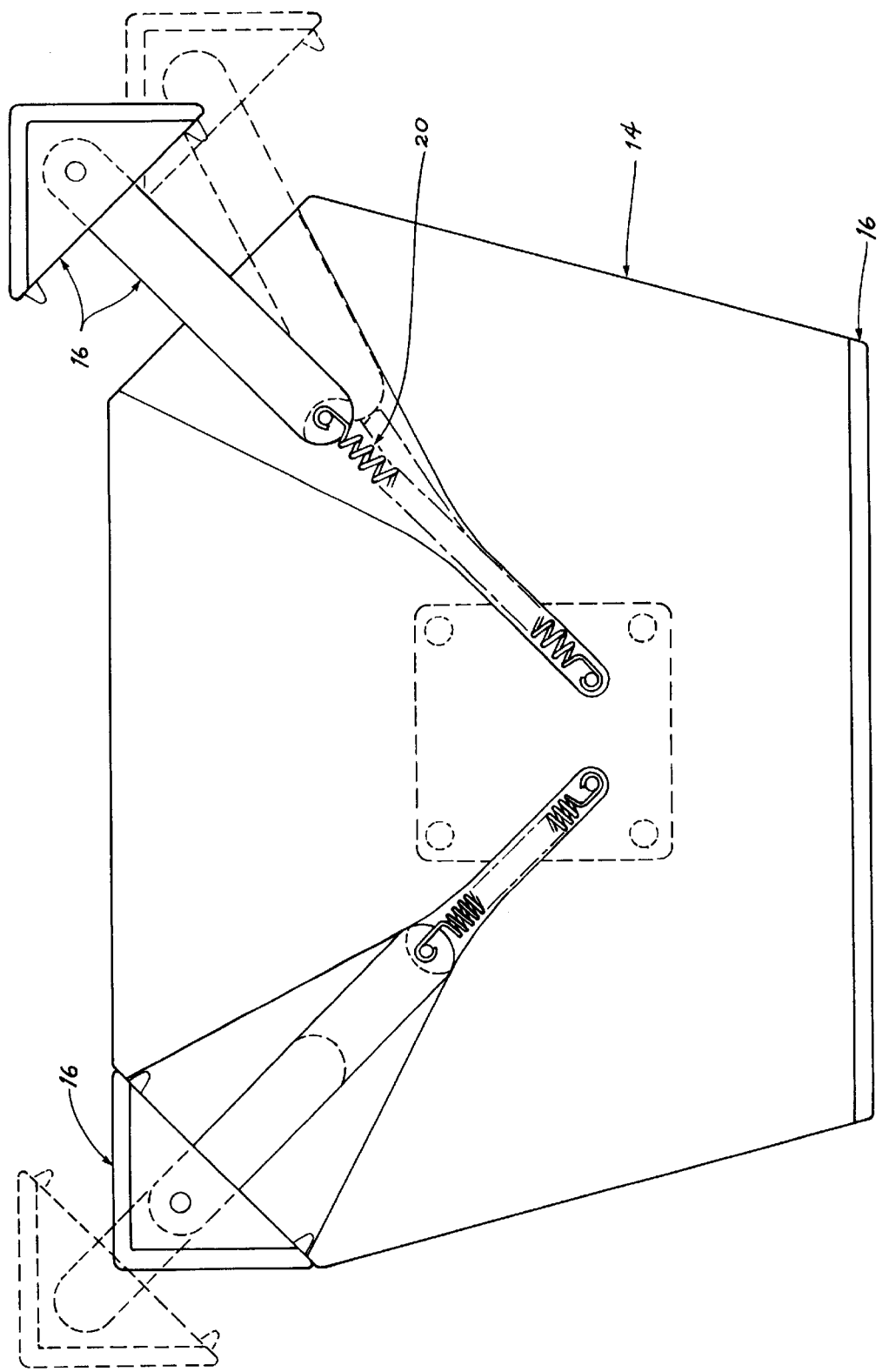

MOBILE OFFICE STAND FOR SUPPORTING A PORTABLE COMPUTER OR ELECTRONIC ORGANIZER IN VEHICLES

BACKGROUND OF THE INVENTION

1. Field of the Invention

This invention relates in general to supporting workstands and more particularly to a supporting workstand for use in a vehicle to hold a portable computer or electronic organizer type of device for easy use by a driver as a mobile or virtual office.

2. Background of the Invention

"Mobile office" or "virtual office" are terms that have come into vogue in recent times with the ability of an individual to receive cellular telephone calls, facsimiles and even link a computer to his office, all from the car while out of the traditional office environment. While the emphasis in the term is on mobility, the dependence of highly mobile individuals operating out of the traditional office environment on electronic computers, organizers and other electronic impediments that have become a way of life for them is clearly assumed.

Since many individuals, such as salesmen, work out of their vehicles while on the road, it is common to find them using the empty passenger seat as a desk or workspace to hold their electronic computers, organizers and cellular telephones, as well as acting as library space for their numerous maps, notes and papers. All of this is both inconvenient and unsafe for the individual who is attempting to pilot a vehicle at the high speeds normally found on today's highway system and who needs to look up a telephone number and dial it. It also poses a hazard for those drivers sharing the roadway with an individual so occupied.

It is important then to provide such an individual using a mobile office with a workspace designed to meet both safety and convenience requirements by providing an ergonomically designed workstand specifically adapted for the mobile office environment as well as being adaptable for use in a regular office environment with a minimum of effort.

OBJECTS AND SUMMARY OF THE INVENTION

Accordingly, it is an object of the present invention to provide an ergonomically designed workstand specifically adapted for the mobile office environment.

It is still another object of the present invention to provide an ergonomically designed workstand specifically adapted for the mobile office environment that stresses safety and ease of use of the various electronic devices held by the workstand while the user is on the road.

It is yet another object of the present invention to provide an apparatus for supporting and holding various electronic devices for use in a vehicle that emphasizes both safety and ease of using various devices.

Another object of the present invention to provide an apparatus for supporting and holding various electronic devices that is adaptable for use in a vehicle or on a desktop in a traditional office environment with a minimum of effort.

In general, the present invention is embodied in an apparatus for supporting and holding an electronic organizer device or computer for use in a vehicle, which includes a generally rectangularly shaped cradle member for retaining the device for use and access. At least one pair of opposed jaw members are mounted on opposed peripheral edges of the cradle member for releasably holding the device in the cradle. The jaw members are biased toward one another by attached tensioned springs. An elongated base or stand member has on a first end a universal ball and socket, swivel or other ratchet joint assembly for attachment to the cradle, which can be releasably locked for holding the cradle in a spatial orientation selected by a user. The opposite second end of the base or stand member is adapted to releasably mate with a mounting member for engagement with a surface for supporting the cradle member.

The novel features of construction and operation of the invention will be more clearly apparent during the course of the following description, reference being had to the accompanying drawings wherein has been illustrated preferred forms of the device of the invention and the same concept adapted to different sized electronic computer devices and organizers and wherein like characters of reference designate like parts throughout the drawings.

BRIEF DESCRIPTION OF THE FIGURES

FIG. 1 is a front view of an embodiment of the present invention in a workstand adapted for desk top use;

FIG. 2 is a side view of the device of FIG. 1;

DESCRIPTION OF THE PREFERRED EMBODIMENT

A preferred method embodying the present invention is now described with reference to the Figures.

The Figures show the present invention embodied in a preferred workstand 10 (entire unit) for supporting and holding a device 12, such as a portable computer, electronic organizer, or the like apparatus (shown only in dotted outline for simplicity), for use on a desk top, or with modifications described below, in a vehicle.

Figure 3:
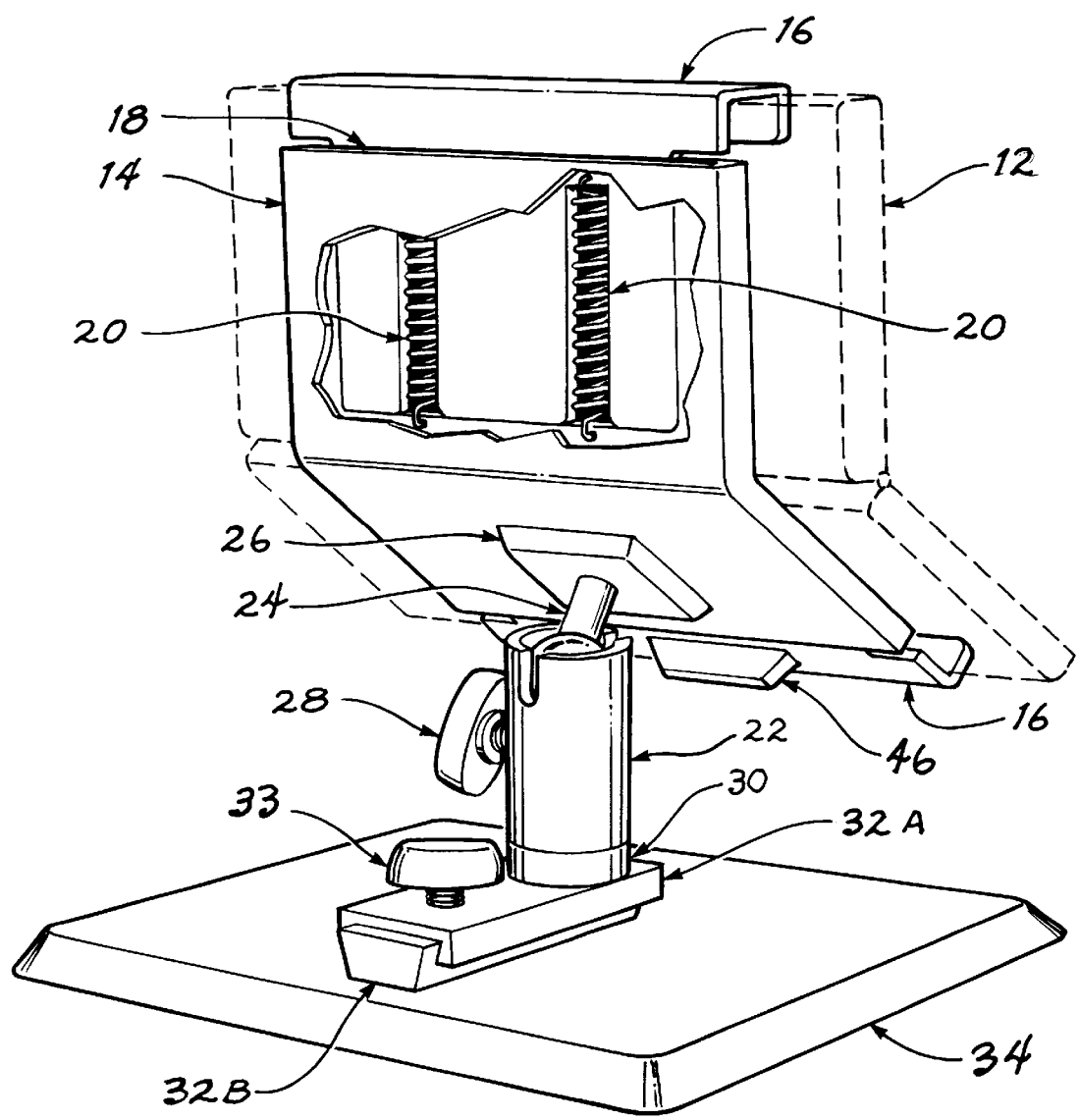
FIG. 3 is a rear perspective view of the device of FIG. 1.

In FIGS. 1 to 3, the invention is embodied in a workstand 10 which has a generally rectangularly shaped cradle member 14 for retaining device 12. While a rectangular or square shape is preferred for cradle member 14, as many devices 12 are generally rectangular themselves in shape, cradle member 14 may also have other shapes such as round, polygonal, or a shape specifically designed to mate directly with a particular model or make of device 12. The rectangular shape is suggested as only a generally overall useful universal type shape designed to fit the many different types, shapes and sizes of devices 12 that the user may wish to place in cradle 14.

Likewise, cradle 14 may be either flat, or formed by two planar members joined along one edge at an obtuse angle or bent from a single planar member as shown in FIG. 2. This latter configuration may be preferred if the device 12 has a non-backlit display and is hinged so that the angle can be chosen to highlight the device's display for the user while it is in workstand 10.

An alternate embodiment of the present invention includes having cradle member 14 formed by at least one bar member which is shaped and adapted to mate releasably with and retain the device. Specifically, the bar member may have at least one pair of opposing jaw members mounted on opposed peripheral edges of the bar member with biasing springs urging the jaw members toward one another for releasably holding the device therebetween similar to that described above.

At least one pair of opposed jaw members 16 are mounted on opposed peripheral edges 18 of cradle member 14 for releasably holding device 12 in cradle member 14.

Figure 5:
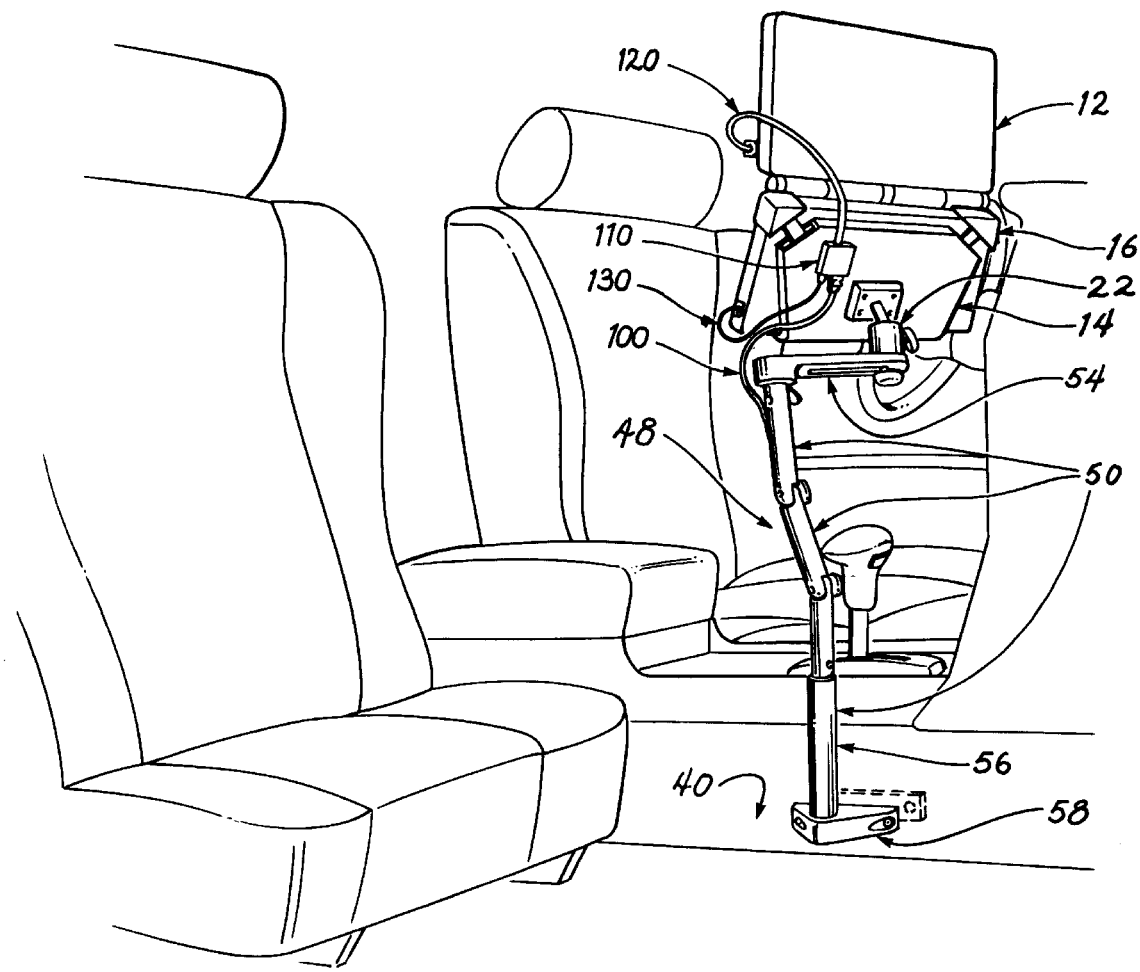
FIG. 5 is an illustration of an alternate embodiment of the invention supporting a computer for use in a vehicle.
Figure 6:
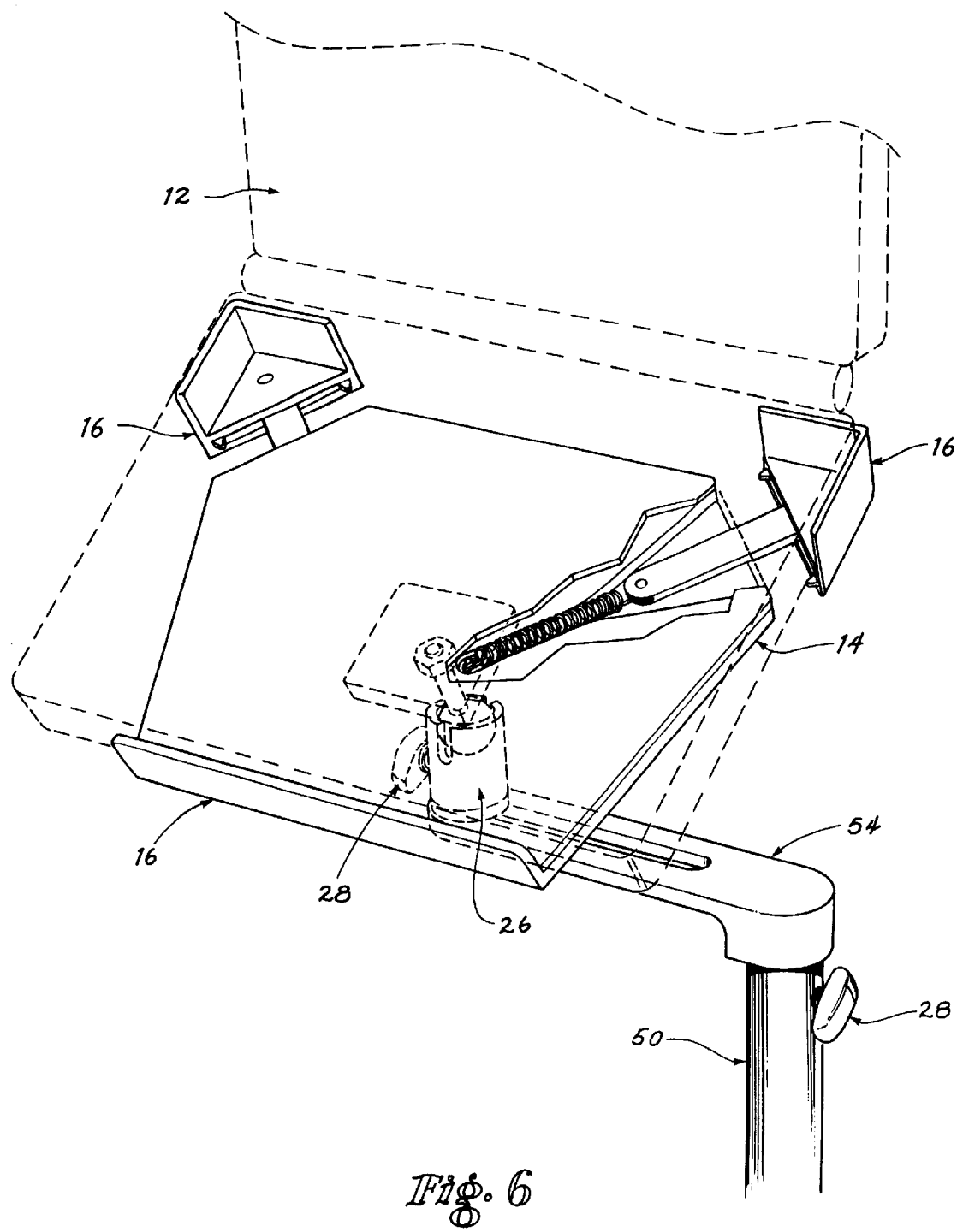
FIG. 6 is a perspective view of an alternate embodiment of the present invention embodied in a workstand; and, FIG. 7 is a top view of the cradle member of the workstand of FIG. 6.

Alternate embodiments are shown in FIGS. 5 to 7 where the opposed jaw members 16 are located at the corners of the cradle member 14. This embodiment may be useful for holding larger devices in the cradle such as a notebook or laptop computer.

Jaw members 16 may consist of a fixed jaw and a movable jaw member so that the movable jaw member can push device 12 against the stationary jaw member for retention therebetween, or even of two movable jaw members.

The immovable jaw member may be formed from the peripheral edge 18 of cradle member 14 opposing the movable jaw member or formed separately as shown in FIGS. 1 to 4.

Jaw members 16 may also be curved into a C-shape to provide an additional holding force to maintain device 12 from slipping from jaws 16 and out of workstand 10, as well as for additional ease in inserting device 12 into work stand 10 as described further below.

Lower jaw member 16 has a lip tab or protrusion 46 to aid the user when inserting the device 12 in the spring loaded jaws 16 to cradle member 14 so that the user may insert the device 12 using only one hand.

Jaw members 16 are biased toward one another for releasably holding device 12 therebetween in contact with cradle member 14. Preferably, on at least one of the movable jaw members of each pair of jaws, there is a spring 20 attached intermediate the jaw member 16 and cradle 14 to provide, when tensioned, a biasing force urging jaw 16 to hold device 12 in contact with cradle member 14. This can be accomplished by providing that jaws 16 are slidably mounted on one side, or even internally of cradle member 14, so that spring 20 when tensioned urges jaws 16 inwardly to hold device 12.

Other means for providing such a biasing force include elastic and other variably tensionable materials used in a method similar to that discussed for springs above.

Likewise, a hook and pyle combination may be used to hold the device in place on the workstand 10 by attaching either one of the components of the hook and pyle combination directly to the device with the mating component attached on the workstand 10, or by providing a hook and pyle restraining belt that encircles device 12 and holds it to workstand 10. All of these alternate structures are also considered to be within the scope of the present invention.

Cradle 14 is held in the desired orientation by an elongated base or stand member 22 having on a first end 24 a universal ball and socket, swivel or other ratchet joint assembly 26.

An alternate embodiment of the present organizer version of the invention includes an elongated base or stand member 22 which may be either a rigid rod assembly 42, with or without a flexible gooseneck assembly 36 (see FIG. 4) with or without the universal joint assembly (i.e., 22, 24, 26, 28 and 30) capable of being bent to a position and of holding that position even when deforming pressure is applied.

Universal ball and socket joint assembly 26 connects elongated base or stand member 22 to cradle member 14. Universal ball and socket joint assembly 26 preferably further has a releasable locking mechanism (such as a frictional tension knob 28) for holding cradle member 14 in a spatial orientation selected by the user.

On an opposite second end 30 of elongated base or stand member 22, there is a coupling member 32 (having mating elements 32a, a slide, and 32b, a rail), that is adapted to mate releasably with a stand member 34 which can either rest on or be attached to a surface 36 for supporting cradle member 14 in a user selected spatial orientation.

As shown, rail 32b is bolted to stand member 34, while slide 32a is attached to the bottom of member 22. As individual rail members 32b can be attached to a number of potential stand members 34, the unit, terminating in slide member 32a, can be moved at will between the (virtual office) vehicle 36 and the actual office desk base member 34.

Additionally, there is preferably on the top surface of 32a, a threaded male knob 33 that acts as a quick release locking pin, facilitating easy removal and installation of the cradle assembly with the member 22 attached to either the (virtual office) vehicle or the actual office desk base member 34.

If the embodiment chosen comprises a rigid rod assembly 48 for elongated base or stand member 50, it is then preferred that second end 30 also include a second universal ball and socket joint assembly to provide for universal positioning of cradle member by offering additional flexibility to compensate for the rigidity of the rod assembly. If the elongated base or stand member 22 comprises a flexible gooseneck assembly 36 as shown in FIG. 4, the second universal ball and socket joint assembly is less needed.

An alternate embodiment is shown in FIG. 5 where workstand 10 is mounted on a rigid rod assembly 48 comprising a plurality of individually adjustable segmented sections 50 ending at a top end 52 with a mounting arm 54 for connection to workstand 10 and at an opposite end 56 to a floor mounting fixture 58 which is shown in FIG. 5 as being mounted to the transmission tunnel of the vehicle.

FIG. 6 illustrates in greater detail how the workstand of FIG. 5 is held to mounting arm 54 and operates to hold an organizer (illustrated in dotted outline) by jaw members 16.

Figure 4:
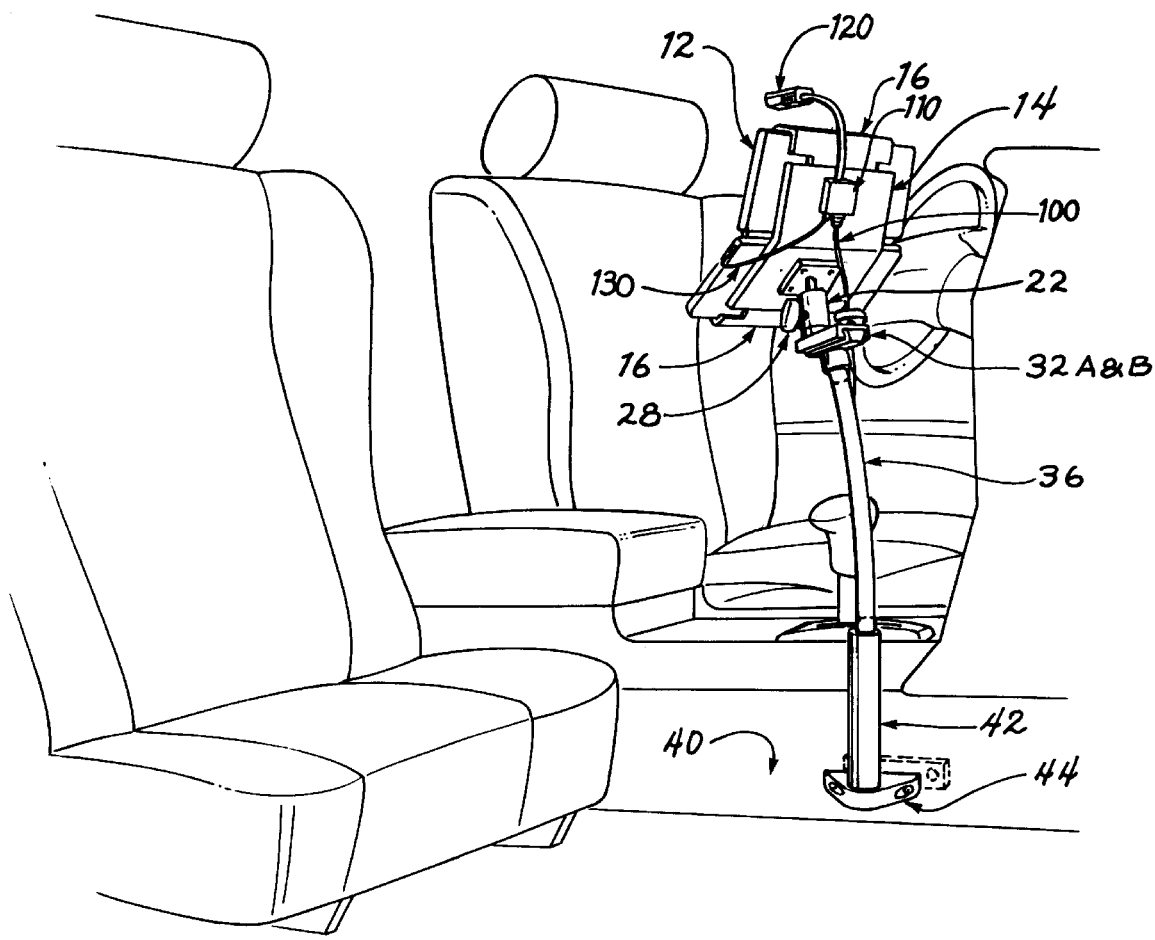
FIG. 4 is an illustration of the invention supporting an electronic organizer for use in a vehicle.

Surface 40 to which the unit 10 can be mounted may vary from a vehicle floor board to any other suitable mounting surface in a vehicle's interior compartment, as shown in FIGS. 4 and 5, or even, as shown in FIGS. 1 to 3, to a table top model capable of free standing on a flat surface as on a office desk. If workstand 10 is to be mounted in a vehicle, an appropriate mounting assembly 44 may be semi- or permanently attached to surface 40 by such methods as bolting or screwing the mounting assembly 44 to surface 40.

FIG. 7 illustrates how jaw members 16 operate in association with spring members 20 to adjust outwardly to engage the organizer and retain it on cradle 14.

For further ease and convenience, the preferred embodiment of the invention may or may not include a light mounted on cradle member 14 for illuminating device 12 when held in cradle 14, making the workstand 10 useful in nighttime and dim light conditions. The light is preferably mounted on a gooseneck extension for mounting in the vehicle compartment so that it can be adjusted by the user as needed, or it can be mounted directly to cradle member 14 along the top edge 18.

Alternate embodiments include a separate mounting means for mounting the light to the windshield with suction cups, independent of workstand 10 as with this configuration it is easier for a user to locate the screen "sweet spot" (i.e., that spot where glare on the screen is minimized for the user's location).

Other embodiments of the present invention include having a light mounted remotely of the cradle assembly, such as mounting the light to the windshield or other portion of the passenger cabin in which the device may be used. By remotely mounting the light to the windshield or cabin portion, the light may be positioned to avoid creating a glare on the cradle assembly that reflects into the eyes of the user.

Finally, since the interior compartments of most vehicles offer a connection to electrical power through the cigarette lighter, the preferred embodiment of the present invention would also include an electrical connection and wiring for providing electrical energy for powering device 12 while it is held on cradle member 14 when used in the user's vehicle.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. An apparatus for supporting and holding an electronic organizer device having opposed peripheral sides for use in a vehicle, comprising:
   a cradle member generally rectangular in shape and having a peripheral edge for retaining the device;
   holding means, attached to said cradle member, for releasably engaging and gripping opposite peripheral device sides, said holding means extending generally perpendicular from said cradle for holding the device in said cradle member generally parallel to said cradle member;
   said holding means further comprising at least one pair of opposing jaw members mounted on opposed, peripheral edges of said cradle member, and, biasing means for biasing said jaw members toward one another for releasably holing the device therebetween on said cradle member;
   a stand member, attached at a first end to said cradle member, and having a second end adapted for engagement with a surface for supporting said cradle member in a user selected spatial orientation for use by a user.

2. The apparatus of claim 1 wherein at least one of said at least one pair of opposing jaw members comprises an immovable jaw member and a movable jaw member.

3. The apparatus of claim 2 wherein said immovable jaw member is formed from the peripheral edge of said cradle member opposing said movable jaw member.

4. The apparatus of claim 1 wherein said biasing means comprises, for each pair of opposing jaw members, a spring attached to each jaw member to provide, when tensioned, a biasing force urging said jaw to hold the device on said cradle member.

5. The apparatus of claim 1 wherein said stand member further comprises:
   an elongated member having on one end means for attachment to said cradle member and on an opposite second end means for attachment to said surface.

6. The apparatus of claim 5 wherein said elongated member comprises a flexible gooseneck support.

7. The apparatus of claim 5 wherein said elongated member comprises a rigid supporting rod member.

8. The apparatus of claim 1 wherein said first end of said stand member attaches to said cradle member by means of a universal ball and socket joint assembly adapted to permit said cradle member to be spatially oriented.

9. The apparatus of claim 8 wherein said universal ball and socket joint assembly further includes releasable locking means for holding releasably said cradle member in a spatial orientation selected by a user.

10. The apparatus of claim 1 wherein said second end of said stand member further comprises:
    a first coupling member; and,
    a stand member adapted to mate releasably with said first coupling member and for engagement with said surface to support said cradle member.

11. The apparatus of claim 1 further including: light means for illuminating the device on said cradle member.

12. The apparatus of claim 11 wherein said light means is mounted on said cradle member.

13. The apparatus of claim 11 wherein said light means is mounted to the vehicle.

14. The apparatus of claim 1 further including:
    means for providing electrical energy for powering the device on said cradle member.

15. The apparatus of claim 1 wherein said cradle member is generally V-shaped and is formed by two generally rectangular planar members meeting along one common edge at an obtuse angle for releasably mating with and retaining the device.

16. An apparatus for supporting and holding an electronic organizer device having opposed peripheral sides for use in a vehicle, comprising:
    a cradle member having at least one bar member with peripheral edges, said at least one bar member shaped and adapted to mate releasably with and retain the device,
    said at least one bar member further comprising at least one pair of opposing jaw members mounted on opposed peripheral edges of said at least one bar member, and, biasing means for biasing said jaw members toward one another for releasably holding the device therebetween on said at least one bar member; and,
    holding means, attached to said cradle member, for releasably engaging and gripping opposite peripheral device sides, said holding means extending generally perpendicular from said cradle for holding the device in said cradle member generally parallel to said cradle member;
    a stand member, attached at a first end to said cradle member, and having a second end adapted for engagement with a surface for supporting said cradle member in a user selected spatial orientation for use by a user.

17. The apparatus of claim 16 wherein at least one of said at least one pair of opposing jaw members comprises an immovable jaw member and a movable jaw member.

18. The apparatus of claim 19 wherein said immovable jaw member is formed from the peripheral edge of said cradle member opposing said movable jaw member.

19. The apparatus of claim 16 wherein said biasing means comprises, for each pair of opposing jaw members, a spring attached to each jaw member to provide, when tensioned, a biasing force urging said jaw to hold the device on said cradle member.

20. An apparatus for supporting and holding a portable computer or electronic organizer device having opposed peripheral sides for use in a vehicle, comprising:

a generally rectangularly shaped cradle member for releasably mating with and retaining the device;

means, attached to said cradle member, for releasably holding the device in said cradle member, having at least one pair of opposing jaw members mounted on opposed peripheral edges of said cradle member, and, biasing means for biasing said jaw members toward one another for releasably holding the device therebetween on said cradle member; and, an elongated stand member having on a first end a universal ball and socket joint assembly for attachment of said elongated stand member to said cradle member, said universal ball and socket joint assembly further having releasable locking means for holding releasably said cradle member in a spatial orientation selected by a user, and on an opposite second end a first coupling member adapted to releasably mate with a stand member for engagement with a surface for supporting said cradle member in a user selected spatial orientation.

21. The apparatus of claim 20 wherein said biasing means comprises, for each pair of opposing jaw members, a spring attached to each jaw member to provide, when tensioned, a biasing force urging said jaw to hold the device on said cradle member.

22. The apparatus of claim 20 wherein said elongated member comprises a flexible gooseneck support.

23. The apparatus of claim 20 wherein said elongated member comprises a rigid supporting rod member.

24. The apparatus of claim 20 further including: light means for illuminating the device on said cradle member.

25. The apparatus of claim 24 wherein said light means is mounted on said cradle member.

26. The apparatus of claim 24 wherein said light means is mounted to the vehicle.

27. The apparatus of claim 20 further including:

means for providing electrical energy for powering the device on said cradle member.

28. The apparatus of claim 20 wherein said cradle member comprises two generally rectangular planar members, joined along one edge at an obtuse angle.

29. An apparatus for supporting and holding a portable computer or electronic organizer device for use in a vehicle, comprising:

a generally V-shaped cradle member formed by two generally rectangular planar members meeting along one common edge at an obtuse angle for releasably mating with and retaining the device said cradle member having opposed peripheral sides;

means, attached to said cradle member, for releasably holding the device in said cradle member, having at least one pair of opposed jaw members mounted on opposed peripheral edges of said cradle member, at least one of said at least one pair of opposed jaw members comprises an immovable jaw member and a movable jaw member, said immovable jaw member being formed from the peripheral edge of said cradle member opposing said movable jaw member, and, for each pair of opposed jaw members, a spring attached to at least is one movable jaw member of the pair to provide, when tensioned, a biasing force urging said jaw members toward one another for releasably holding the device therebetween on said cradle member; and, an elongated stand member having on a first end a universal ball and socketjoint assembly for attachment of said elongated stand member to said cradle member, said universal ball and socket joint assembly further having releasable locking means for holding releasably said cradle member in a spatial orientation selected by a user, and on an opposite second end a first coupling member adapted to releasably mate with a stand member for engagement with a surface for supporting said cradle member in a user selected spatial orientation.

30. The apparatus of claim 29 wherein said elongated member comprises a flexible gooseneck support.

31. The apparatus of claim 29 wherein said elongated member comprises a rigid supporting rod member.

32. The apparatus of claim 29 further including: light means for illuminating the device on said cradle member.

33. The apparatus of claim 32 wherein said light means is mounted on said cradle member.

34. The apparatus of claim 32 wherein said light means is mounted to the vehicle.

35. The apparatus of claim 29 further including:

means for providing electrical energy for powering the device on said cradle member.

\* \* \* \* \*